June 11, 1968 W. J. KING 3,388,009

METHOD OF FORMING A P-N JUNCTION BY AN IONIC BEAM

Filed June 23, 1965 3 Sheets-Sheet 1

INVENTOR.
WILLIAM J. KING
BY
Kenway, Jenney & Hildreth
ATTORNEYS

METHOD OF FORMING A P-N JUNCTION BY AN IONIC BEAM
Filed June 23, 1965 3 Sheets-Sheet 2
FIG. 2
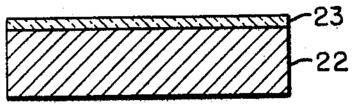
FIG. 3
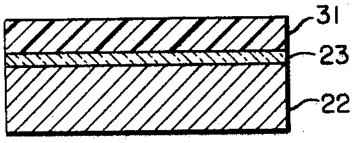
FIG. 4
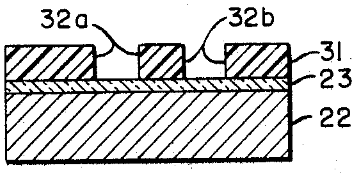
FIG. 5
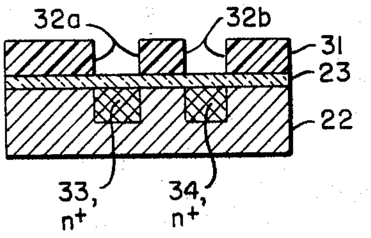
FIG. 6
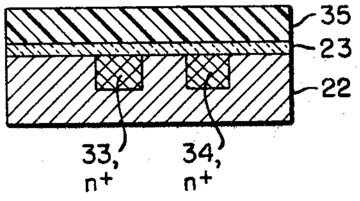
FIG. 7
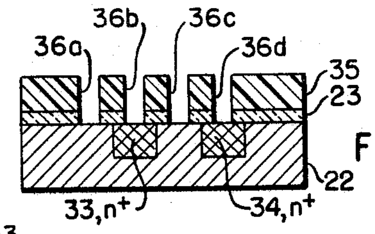
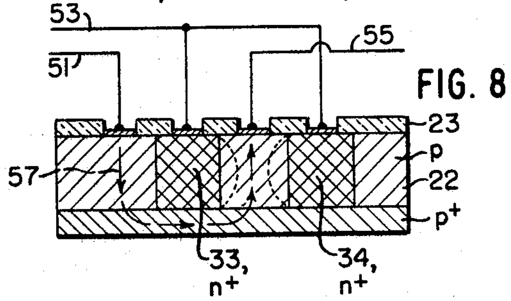
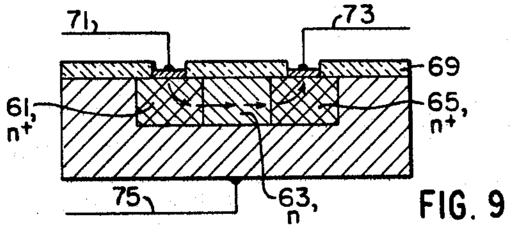
INVENTOR.
WILLIAM J. KING
BY
Kenway, Jenney & Hildreth
ATTORNEYS

METHOD OF FORMING A P-N JUNCTION BY AN IONIC BEAM

Filed June 23, 1965 3 Sheets-Sheet 3

INVENTOR.
WILLIAM J. KING
BY
Kenway, Jenney & Hildreth
ATTORNEYS

United States Patent Office 3,388,009
Patented June 11, 1968

3,388,009

METHOD OF FORMING A P-N JUNCTION BY AN IONIC BEAM

William J. King, Reading, Mass., assignor to Ion Physics Corporation, Burlington, Mass., a corporation of Delaware Filed June 23, 1965, Ser. No. 466,218
7 Claims. (Cl. 148—1.5)

ABSTRACT OF THE DISCLOSURE

This invention describes a novel process for producing semiconductor devices which comprises the forming of an insulating, and preferably passivating, layer on the surface of a semiconductor body and irradiating the insulated surface with ions of an energy sufficient to penetrate the layer and enter the underlying body and thereby modify the underlying conductivity of the body below the layer.

This invention relates in general to the manufacture of semiconductor devices and in particular to the implantation of ions in the manufacture of solid state devices and the fabrication of microcircuits.

One phase of the manufacture of semiconductor devices has been the subject of intensive investigation and development. That is the process of "doping" of the semiconductor element to provide desired areas or zones of differing conductivities. Prior art techniques include diffusion, evaporation, apitaxial growth and sputtering, some of which have enjoyed a great deal of success in the manufacture of operative and commercial devices.

For several years, it has been suggested that doping could be achieved by ion implantation. It was early proposed that a substance such as N-type germanium could be bombarded by ions of an acceptor impurity, for example boron, to convert a region of the germanium from N to P conductivity. Conversely, P-type germanium has been bombarded with ions of a donor impurity such as phosphorous to convert a region to N-type conductivity.

Various assumed disadvantages have delayed the adoption of the ion implantatiton technique on a more general scale. Among those cited have been the radiation damage frequently done to the surface of the semiconductor element being bombarded by the ions of the doping impurity. Also, there has been considerable difficulty in obtaining suitable sources of ions of materials such as boron or phosphorous as might commonly be used to adjust the conductivity of an area of the semiconductor device.

The primary object of the present invention is, accordingly, the fabrication of efficiently operating and reproducible semiconductor devices.

Another object of the present invention is the simplification and improvement of doping techniques in semiconductor devices.

A further object of the present invention is the improvement of apparatus for ion implantation in semiconductor devices.

A still further object of the present invention is close control of junction depths and configurations in semiconductor devices.

A still further object of the present invention is the reduction of radiation damage effects in semiconductor devices caused by ion impingement.

In general, the present invention consist of novel apparatus and techniques for the doping of semiconductor material by ion implantation. The material so doped may be utilized in any one of a variety of devices such as diodes, transistors, solar cells, microcircuits, thick and thin film devices, radiation detectors and the like. The implantation of ions in accordance with the present invention may be carried out even though passivated layers exist upon the surface of the semiconductor being processed.

Generally, a conventional accelerator utilizing well known high voltage power supplies is used to develop the ion implanting beam. The beam of ions is passed through a momentum analyzing system to remove undesired contaminants and then is scanned by suitable deflection elements to obtain uniform irradiation of a sample. The exposure time, the energy of the beam or the current of the beam may be adjusted, but it is preferred to rotate the sample being irradiated about an axis perpendicular to the ion beam in order to vary the doping concentration in the surface layer. The rotation may be so programmed that a continuous implantation of ions may be obtained from the surface to a closely controlled maximum depth.

In addition to the junction control obtained, the technique and apparatus of the present invention also permit the formation of junctions beneath a passivating layer of oxide upon the surface of the sample. Because the passivating layer may be left in place during subsequent operational steps in fabricating the semiconductor device, there is no need for the successive oxidizing and oxide removal; steps normally encountered in the fabrication of semiconductor devices by processes of the prior art. Moreover, the temperature at which the process is carried out may be easily maintained sufficiently low that the characteristics of the starting materials are not significantly changed.

For a better understanding of the present invention together with other and further objects, advantages and features, reference should be made to the following detailed description of a preferred embodiment, which should be read in conjunction with the appended drawing in which:

FIG. 2 is a standard slice of semiconductor material covered with a passivating layer;

FIG. 3 is the slice of FIG. 2 further covered by a layer of photoresist material;

FIG. 4 is the original standard slice after portions of the photoresist have been exposed to light and the remainder masked and developed away;

FIG. 5 shows the same slice after ions have been implanted in discrete areas;

FIG. 6 is the same slice after a new layer of photoresist has been applied;

FIG. 7 is the same slice after the new layer is exposed to light, small portions being masked and developed away to accommodate contact members;

FIG. 8 is a view of a vertical unipolar field effect transistor;

FIG. 9 is a view of a unipolar horizontal transistor;

Figures 1, 1A:
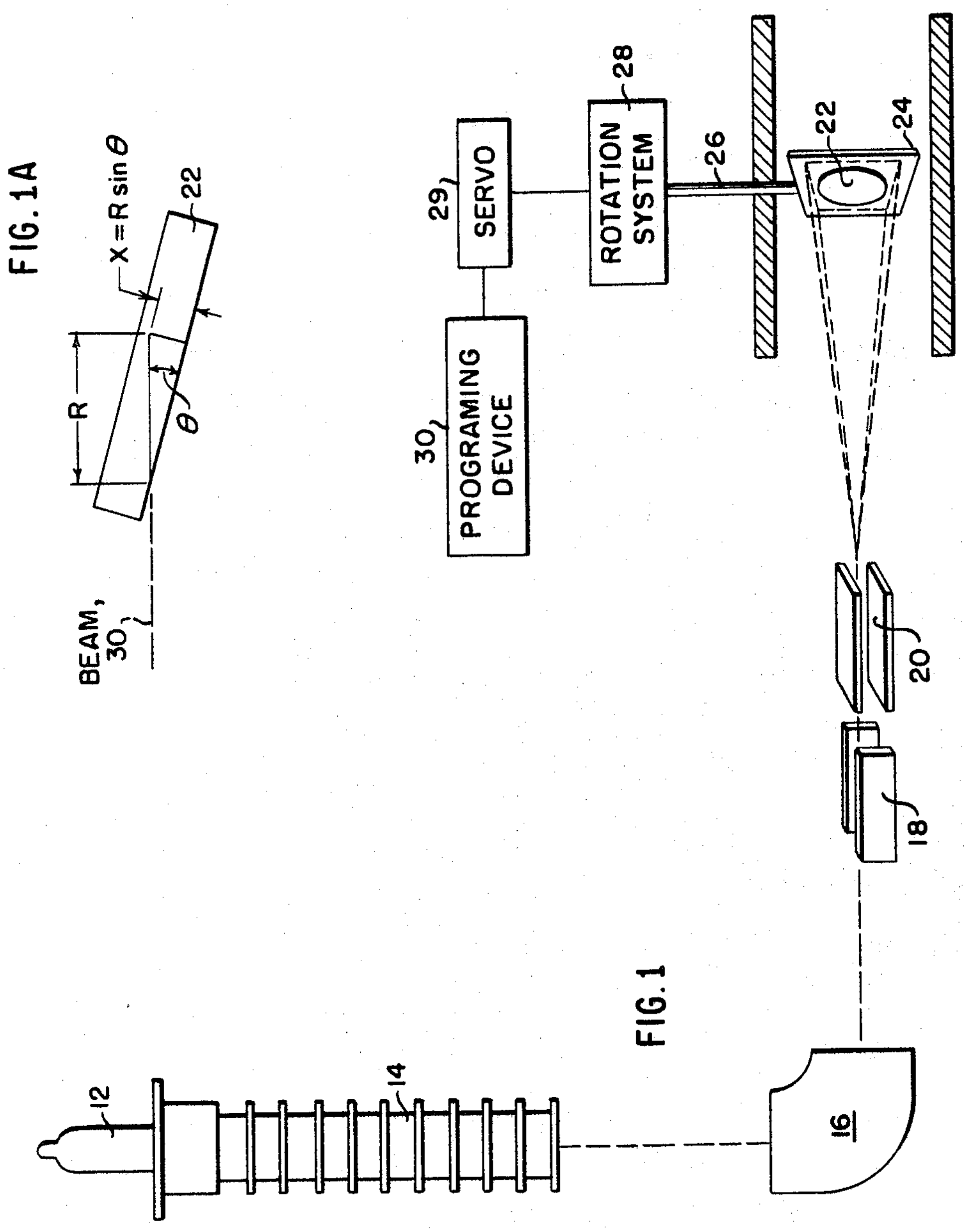
FIG. 1 is a schematic showing of the ion implantation apparatus of the present invention.

FIG. 1 is an illustration in schematic form of the apparatus used for ion implantation in the present invention. It should be understood that the apparatus here illustrated is useful in the manufacture of any one of a number of semiconductor devices and, in fact, is also useful in the manufacture of various single-crystal and thin-film devices. The basic elements of the apparatus include an ion source 12 mounted atop an accelerator tube 14. From the accelerator tube 14, ions emerge and pass through a momentum analyzing system such as an analyzing magnet 16. The ion beam emerging from the analyzing magnet 16, is passed through a deflection system which may be composed of horizontal beam scanner plates 18 and vertical beam scanner plates 20. The scanned beam emerges from the beam scanner plates and is directed upon a sample 22. The sample 22 is mounted upon a plate 24 which is supported by a shaft 26. A rotation system 28 drives the shaft in such a manner that the sample is rotated continuously from a position normal to the impinging ion beam to a position parallel to the ion beam.

The effect which is obtained by sample rotation and scanning ion bombardment in the apparatus of FIG. 1 is best understood by reference to FIG. 1*a*. In FIG. 1*a*, the impinging ion beam is shown by the dotted line 30 in a position which it occupies during an instant of its scanning motion. Also, the sample 22 is shown as a block on which the beam impinges in a position which it assumes during an instant of its rotation.

As is well known, ions have discrete ranges independent of incideint angle. Therefore, the distance below the surface of the sample at which the ions come to rest is determined by the angle of the incident ion beam. In FIG. 1*a*, X is the penetration depth normal to the surface of the sample; R is the range in the material of which the sample is composed (of the incident ions) at energy E; and $\theta$ is the angle between direction of the incident beam and the sample surface.

Under such circumstances, $$X=R_E \sin \theta$$

With the illustrated apparatus, the sample may be rotated continuously while the energy of the ion beam is held constant. Continuous implantation of ions is then obtained from the surface of the sample to a depth corresponding to the maximum range of the ions. Although the beam current is held constant during ion implantation, the incident flux rate decreases as $\theta$ decreases. A servo system 29 may, therefore, be utilized to control the speed of rotation of the sample and, accordingly, the integrated flux at any given depth below the surface of the sample. A variable program device 31 may be arranged to control the servo system 29 to adjust the concentration gradient, which determines the junction profile.

The entire apparatus is enclosed in a so-called clean bench to avoid the possibility of failing to irradiate the entire surface which might be caused by dust particle beam shadowing. It should also be noted that implantation along crystallographic directions is deliberately avoided in order that channelling will not result. As is well known, channelling causes very deep ion penetration when the incident ion enters the material normal to a relatively open major plane and passes deep into the crystal. Such ions can cause marked deterioration of operation of certain of the devices subsequently fabricated.

Ion energies in the 100–300 kev. range have proven suitable, although ion beams of lower and of higher energy may be used. It is generally desirable, however, to maintain ion energy levels above 50 kev. to minimize sputtering. Should sputtering occur, the passivating layer on the sample would, of course, be destroyed.

As has been noted, conventional acceleration may be employed, but electrostatic belt-type generators such as those bearing the trademark Van de Graaff are most useful in producing devices in quantities less than are normally mass-produced. This is because Van de Graaff accelerators are inherently capable of control in numerous parameters. Ion energy, ion current, integrated beam current and energy spread all may be closely controlled. By way of example, the integrated beam current may be controlled to within 1 kev. This represents a spread of only .33 percent at 300 kev., which corresponds to a range spread of $P^{31}$ ions or approximately of 13 A. in 4000 A. Straggle in junction definition is primarily due to statistical variations in ion range and impurity movements during subsequent annealing. However, all factors can be controlled sufficiently well to control junction depth within 0.1 micron. Of course, after the establishment of the specifications for producing a given device, a conventional accelerator may be used for mass production.

Various details have been omitted from FIG. 1 to permit easier understanding of the apparatus there illustrated. Actually, the ion beam emerging from the accelerator 14 passes through a drift tube to the analyzing magnet 16. The magnet itself is of the momentum analyzing type. Also, a second drift tube is utilized on the output side of the magnet and suitable electronic gear is used to provide the appropriate scanning voltages to the deflection plates 18 and 20. The sample holder itself is preferably made of stainless steel to avoid contamination from sputtered ions. Also, the entire implantation chamber should be enclosed by a wall of concrete for radiation protection. Provision may also be made to heat or cool the sample holder to obtain implantation temperatures which may range from −195° C. to 800° C. The sample itself may typically be .015 inch in thickness and may be about one inch in diameter. A large number of devices may be included in the sample slice or, alternatively, a number of circuits may be included. A passivating layer of about 1,000 A. in thickness is formed on the sample. In the case of silicon, the passivating layer is made of silicon dioxide. That layer may be deposited thermally or by an ion beam sputtering process of the type disclosed in copending application Ser. No. 464,365, entitled Formation of Tenacious Deposits, which application is assigned to the same assignee as the present application and was filed on or about June 16, 1965.

FIGS. 2 through 8 illustrate sequential steps in the processing of a semiconductor device utilizing the apparatus of FIG. 1. Although the technique of ion implantation through a passivation layer is applicable generally to a number of semiconductor and other products, details of the process can be appreciated from a consideration of its use in fabricating a typical semiconductor device, in this case, a vertical field effect transistor.

In FIG. 2, a portion of a silicon slice 22 is illustrated as having a passivating layer of silicon dioxide 23 formed on its upper surface. The next step of the process is illustrated in FIG. 3, wherein a layer of photoresist material 31 has been applied over the passivating layer 23. The thickness of the layers is not critical, although the combined thickness of the layers of oxide and photoresist should be sufficient to prevent entry of ions of the highest energy used into the masked areas of the silcon lattice.

FIG. 4 illustrates the composite structure after the layer of photoresist has been exposed through a suitable mask. When the exposure is made, those portions of the photoresist layer exposed to light are hardened in place upon the passivating layer, and areas where the mask has prevented exposure are not so hardened. These areas, indicated by the reference numerals 32A and 32B, are then developed away from the remaining layer, providing openings through the photoresist layer through which ions may be implanted, using the apparatus of FIG. 1.

The actual sample being exposed in the apparatus of FIG. 1 may include a great number of units, each of which may have the configuration and make-up of the unit shown in FIG. 4. After ion implantation, each unit has the appearance and characteristics of the unit illustrated in FIG. 5. Ions implanted through the openings 32A and 32B penetrate the passivating layer 23 and lodge in the substrate to form areas 33 and 34 of modified conductivity. Assuming the sample to be made of P-type silicon and the ion beam to be of phosphorous, the areas 33 and 34 are converted from P-type conductivity to N-type conductivity.

Next, all of the remaining photoresist material of the layer 31 is removed by a suitable solvent and a new continuous coating of photoresist 35 is applied over the passivating layer 23. The device is then at the stage of manufacture shown in FIG. 6. Now, once again, a suitable mask is employed to expose portions of the photoresist layer 35 and unexposed portions are developed away in the areas 36A, 36B and 36C. It is then necessary that contact be made to desired areas of the device through the openings. Then, and for the only time in the fabrication process, the oxide layer 23 is disrupted. Portions of that layer beneath the openings 36A, 36B and 36C must be removed, for example, by an etching process utilizing hydrofluoric acid. The device then appears as illustrated in FIG. 7.

Following the removal of the portions of the passivating layer, contacts may be formed in any one of several ways. The most commonly used method is probably by evaporating metal upon the upper surface of the device, during which process a certain amount of metal is deposited through the openings 36A, 36B and 36C. Then, the layer of photoresist may be dissolved away using a suitable solvent. The evaporated metal layer breaks away adjacent the contact points, and suitable leads may be attached to the contact areas by thermo-compression bonding, ultrasonic welding or other conventional methods.

However, much more effective contact formation is possible by using a sputtering technique such as that described in the copending application cited hereinabove. Nickel or any one of several other metals may be sputtered upon the upper surface of the device. Because the surface of the semiconductor at the base of the openings 36A, 36B and 36C is hard compared to the photoresist, the sputtered metal adheres tenaciously to the contact areas, but breaks away at the desired boundary points as the soft photoresist is subsequently dissolved away. After the dissolving of the photoresist, the various devices may be separated and completed by standard processes of lead attachment to the contact areas and suitable packaging.

In FIG. 8 is shown the operation of a vertical unipolar field effect transistor of the type whose fabrication has been outlined. At the base of the bulk material 22, which has P-type conductivity, a relatively $p^+$ layer may be formed, either by ion bombardment, or by more conventional methods. The islands of $n^+$ conductivity, 33 and 34 are as previously illustrated, having been forwarded by ion bombardment. A lead 51 is bonded to the bulk material through the opening 36A in the oxide layer 23. Similarly, a lead 53 is bonded to the $n^+$ islands 33 and 34 through the openings 36B and 36D, respectively, in the oxide layer 23. Here it should be noted that the $n^+$ islands can actually be sections of the same continuous ring of $n^+$ material, if it is desired to make a circular rather than a rectangular device. Finally, the lead 55 is attached through the opening 36C in the oxide layer 23 to the central area of the P-type bulk material. If desired, the lead 55 may be attached to the lower surface of the device, in which case the opening 36C would, of course, be unnecessary.

The lead 51 serves as the "source" lead; the lead 53 serves as the "gate" lead; and the lead 55 serves as the "drain" lead. The dashed line 57 shows the path of current through the device and the dotted lines 59 show the action of the gate of the device. Current flows downwardly from the lead 51 and meets no significant resistance in the $p^+$ layer. It passes beneath the $n^+$ island 33 and upwardly between the two $n^+$ islands 33 and 34 toward the drain lead 55, which is, of course, highly negative.

The dotted lines extending outwardly from the $n^+$ islands 33 and 34 indicate the effect of bias being applied to the gate lead 53. As the bias is increased in a positive direction, the path between the islands is choked off to prevent the flow of current to the drain as a result of the fields created. Such transistors are well known in the art, but their operability and characteristics are greatly enhanced when the $n^+$ islands are formed by ion bombardment in accordance with the present invention. The advantages stem principally from the fact that substantially straight-sided islands are formed by ion bombardment whereas diffusion techniques inherently result in islands in which the horizontal dimensions vary with the depth of diffusion.

The same techniques may be varied to produce, for example, unipolar horizontal transistors. The major variation is, of course, in the areas being masked and subsequently exposed, in order that multiple implantations may be made in discrete areas.

FIG. 9 is an illustration of a unipolar horizontal transistor at a stage of manufacture where the necessary ion implantations have been made. In this instance, ion implantations are made side-by-side, and the resulting structure includes the P-type bulk material 61 in which there are implanted contiguous islands 63 of $n^+$ material, 65 of n material and 67 of $n^+$ material. The upper surface of the device is covered by a passivating layer 69 except in those areas where contacts are formed.

Three leads are used with the device of FIG. 9. They are the source lead 71, the drain lead 73 and a gate lead 75. The gate lead is connected to the bulk material as is indicated by the contact at the lower surface. A reverse bias, in this case negative, is applied to the lead 75 and the flow of current from the source lead 71 to the drain lead 73 may be controlled. The effect of increasing bias is to narrow the channel through the n element 65.

Indicative of the superior results obtained in doping by ion implantation is the fact that only the contact at the lower surface is necessary for gating control. Comparable devices made by diffusion or other prior art techniques generally require gate contacts above and below the channel.

It is desirable after the implantation of ions has been completed to anneal the device to eliminate any damage caused by radiation. Generally, if a temperature of 750° C. is not exceeded in the annealing process, radiation damage can be repaired without effect upon the device. Actually, temperatures from 300 to 500° C. are adequate to remove radiation damage, but temperatures up to 750° C. held for a period of time ranging up to sixteen hours are needed to supply the activation energy to place the majority of implanted ions in substitutional positions.

In FIGS. 10 through 13, stages of manufacture of a conventional transistor are illustrated. Here again, the unit shown may be one of many to be fabricated from a single slice of semiconductor material. One may start with bulk material or substrate 41 of, for example, P-type silicon. One surface 42 of the slice may be of $P^+$ material for enhanced collector characteristics. The layer 42 may be converted to $P^+$ material by any one of several methods, including ion implantation, using, for example, boron ions.

The opposite surface of the slice may be covered with a passivating layer 43, of silicon dioxide in the case of a silicon slice, and it may be further covered with a layer of photoresist material 44.

Following the same techniques of masking and light exposure, a central portion 45 of the photoresist material is developed away, and ions of phosphorous or other N-type material are implanted in the slice 41 through the passivating layer 43 to form an N-type region 46. Of course, the apparatus and technique described in connection with FIG. 1 are preferably utilized for this operation.

Figure 10:
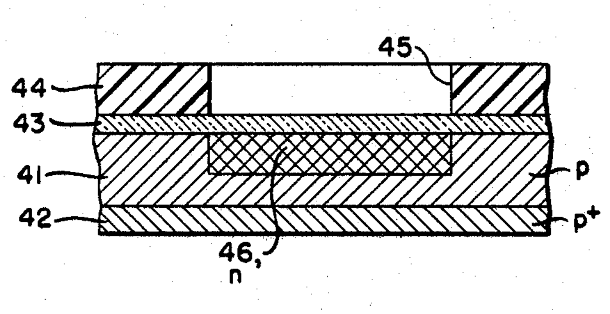
FIG. 10 is a view of a conventional P–N–P transistor at an early stage of its manufacture.
Figure 11:
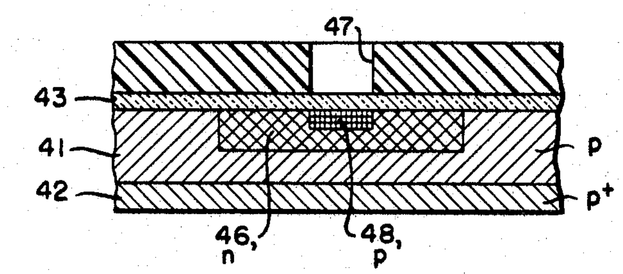
FIG. 11 is a view of the transistor of FIG. 10 after the formation of the emitter region.

Subsequently, as indicated in FIG. 11, the entire layer of photoresist may be removed and replaced, or a new layer may simply be formed over the old. A small region 47, relative to that of FIG. 10, is left unexposed and is developed away. Then, once more with the apparatus and techniques of FIG. 1, ions of boron, or other P-type material are implanted through the passivating layer 43 to form a relatively small P-type sub-region 48 in the N-type region 46. In this operation, the ions are, of course, at lower energy than those which formed the region 46. Thus, a shallower penetration is obtained.

Figure 12:
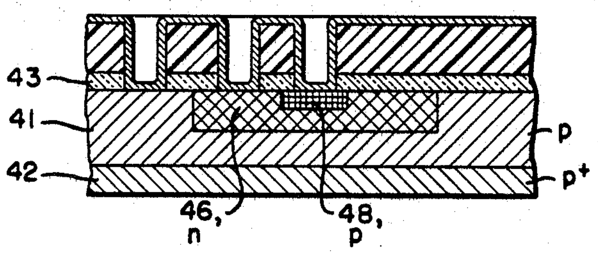
FIG. 12 is a view of the device of FIG. 11 after the deposition of metal contacts to the device.

For the making of contacts, the same general procedures described above in connection with the unipolar transistors may be followed including the etching away of small areas of the passivating layer 43. Then, by evaporation of any one of several metals, or preferably, by the sputtering of nickel in a manner similar to that described hereinabove, contact surfaces are formed in the region 48, which serves as the emitter, in the region 46, which serves as the base, and in the bulk material 41 which serves as the collector. FIG. 12 illustrates the resulting structure at this stage of fabrication.

Figure 13:
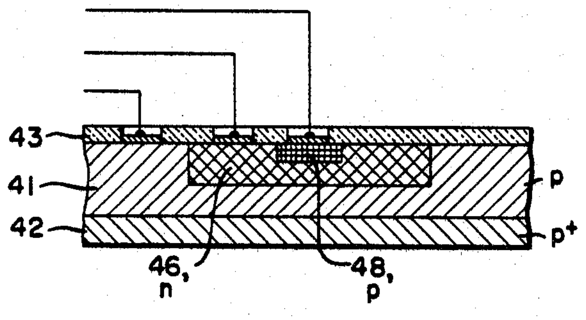
FIG. 13 shows the complete transistor.

Leads may then be attached by thermocompression bonding, ultrasonic welding or by other suitable means; the individual devices may, if desired, be separated from the slice; and each device may be packaged. In FIG. 13, the manner of such attachment of leads to the emitter, base and collector is illustrated.

The devices described are merely illustrative of the practice of the present invention. Numerous other devices may also be made by the same general techniques and they will have the advantages derived from conductivity modification by ion implantation through a passivating layer which is left undisturbed throughout the various manufacturing operations.

The flexibility provided by the basic tools and techniques of the invention is of considerable consequence. Although, typically, penetrations of about 10,000 A. are utilized with energizes of up to 400 kev., and exposures of about 10 seconds, it is possible to vary each of the parameters to achieve other junction depths. Also, the junction profiles may also be varied by suitable adjustments of the implantation program.

The invention provides advantages over processes presently being used which may be summarized briefly as follows:

(1) Ability to work through a passivating layer such as an oxide mask, with the concomitant benefit of avoiding the problems of removal and regrowth of the oxide layer.

(2) The use of relatively low temperatures.

(3) High yield and reproducibility of devices and circuits.

(4) Close control of impurity concentration and distribution.

What is claimed is:

1. In the fabrication of a semiconductor device, the process of modifying the conductive properties of a portion thereof having a given conductivity type, which comprises the steps of selecting a body of semiconductor material of a given conductivity type, forming a passivating layer on a surface of said body, masking said surface of said passivating layer to leave at least a predetermined exposed area thereon, and directing a beam of ions of a conductivity determining impurity material of selected energy upon said predetermined exposed area, said energy being sufficient to cause the ion to penetrate the passivating layer in said exposed area but insufficient to cause the ions to penetrate the mask to implant said ions in said portion and change the conductivity thereof.

2. In the fabrication of a semiconductor device, the process of modifying the conductive properties of a portion thereof which comprises the steps of selecting a body of semiconductor material of a given conductivity type, forming a passivating layer on a surface of said body, masking said surface to leave a first relatively large exposed area thereon, directing a relatively high-energy beam of ions of a first doping material upon said first area to implant said high-energy ions in said body to form a region of material of conductivity type differing from that of said body beneath said first area, again masking said surface to leave a second relatively small exposed area upon said passivating layer above said region, and directing a relatively low-energy beam of ions of a second doping material upon said second area to implant said low-energy ions in said region to form a volume of material within said region having a conductivity type differing from that of said region.

3. In the fabrication of a semiconductor device, the process of modifying the conductive properties of portions of a body of semiconductor material thereof which comprises the steps of selecting a body of semiconductor material of a given conductivity type, forming a passivating layer upon a surface of said body, applying a layer of photoresist material upon said passivating layer, exposing all but a predetermined area of said photoresist material to light to harden the light-exposed material in place, removing said material in said predetermined area, directing a beam of ions of doping material upon said surface, said ions having an energy sufficient to penetrate said passivating layer but insufficient to penetrate said hardened photoresist material and said passivating layer to form a first region of predetermined dimensions within said body beneath said predetermined area, said first region having a conductivity differing from that of said sample.

4. In the process defined in claim 3, the further steps of removing said photoresist material from said first predetermined area, again applying a layer of photoresist material upon said surface, exposing all but a second predetermined area thereof to light to harden the light-exposed material in place, removing said material in said second predetermined area, directing a beam of ions of a second doping material upon said surface to form a second region of predetermined dimensions beneath said second predetermined area, said second region having a conductivity differing from that of said first region.

5. In the process defined in claim 3, the further step of rotating said sample while directing said beam of ions upon said surface to improve the uniformity of implantation of said ions.

6. The process of fabricating a semiconductor device which comprises the steps of selecting a body of semiconductive material of a given conductivity type, forming a passivating layer upon a surface of the body of semiconductor material, masking areas of said passivating layer with hardened photoresist material, implanting ions of doping material in said bulk material beneath unmasked areas of said passivating layer to form regions of material of conductivity type differing from that of said bulk material, and removing portions of said passivating layer above said regions to make electrical contact therewith.

7. The process of modifying the conductive properties of a semiconductive body comprising the steps of selecting a body of semiconductive material of a given conductivity type, forming a passivating layer on a surface of said body, and directing a beam of ions of a material capable of modifying the conductivity of the body on said surface, said ions having an energy sufficient to cause said ions to penetrate said passivating layer and to become implanted in said body beneath said layer and change the conductivity of the body beneath the layer.

References Cited

UNITED STATES PATENTS

| | | | |
|---|---|---|---|
| 2,666,814 | 1/1954 | Shockley | 148—1.5 |
| 2,786,880 | 3/1957 | McKay | 148—1.5 |
| 3,089,793 | 5/1963 | Jordan | 148—187 |
| 3,122,817 | 3/1964 | Andrus | 148—1.5 X |
| 3,184,823 | 5/1965 | Little | 148—187 X |
| 3,255,005 | 7/1966 | Green | 148—1.5 X |

HYLAND BIZOT, *Primary Examiner.*

REEXAMINATION CERTIFICATE (542nd)

United States Patent [19]

King

[11] B1 3,388,009

[45] Certificate Issued Jul. 29, 1986

[54] METHOD OF FORMING A P-N JUNCTION BY AN IONIC BEAM

[75] Inventor: William J. King, Reading, Mass.

[73] Assignee: General Instruments Corp., New York, N.Y.

Reexamination Request:
No. 90/000,856, Sep. 16, 1985

Reexamination Certificate for:

| | |
|---|---|
| Patent No.: | 3,388,009 |
| Issued: | Jun. 11, 1968 |
| Appl. No.: | 466,218 |
| Filed: | Jun. 23, 1965 |

[51] Int. Cl.$^4$ .................... H01L 21/425; H01L 21/42

[52] U.S. Cl. .................................... 148/1.5; 148/187; 148/DIG. 83; 250/492.2; 357/22; 357/34; 357/65; 357/91; 29/576 B

[56] References Cited

U.S. PATENT DOCUMENTS

| | | | |
|---|---|---|---|
| 2,302,760 | 11/1942 | Goodman | 8/6.5 |
| 2,786,880 | 3/1957 | McKay | 136/89 |
| 2,787,564 | 4/1957 | Shockley | 148/1.5 |
| 2,842,466 | 7/1958 | Moyer | 148/1.5 |
| 3,245,895 | 4/1966 | Baker et al. | 204/164 |
| 3,293,084 | 12/1966 | McCaldin | 148/1.5 |
| 4,361,461 | 11/1982 | Chang | 156/662 |

FOREIGN PATENT DOCUMENTS 809330 2/1959 United Kingdom .

OTHER PUBLICATIONS

"P-N Junction Formation Techniques" Contract No. AF33(657)-10505 First Quarterly Report, Second Quarterly Report, Third Quarterly Report.

"P-N Junction Formation Techniques" Contract No. AF33(615)-1097 First Quarterly Report.

International Elektronische Rundschau 1964, No. 7, pp. 377-378.

King, "Solar Cell Produced by Ion implantation Doping", Proc. 4th Photovoltaic Specialists Conf., presented Jun. 2, 1964, pp. B-2-1-B-2-22.

Maguire, "Ion Implants Forge Tailor-Made Junctions", Electronics Apr. 19, 1963, pp. 26-29.

"P-N Junction Formation Techniques", Quarterly Technical Progress, Report No. 2, Contract AF33(615)-1097.

Handbook of Semiconductor Electronics, Editor, Hunter, McGraw Hill 1956, p. 7-23.

"P-N Junction Formation by Ion Bombardment", Technical Documentary Report No. ASD TDR 62 428, May 1962.

*Primary Examiner*—Brian E. Hearn

[57] ABSTRACT

This invention describes a novel process for producing semiconductor devices which comprises the forming of an insulating, and preferably passivating, layer on the surface of a semiconductor body and irradiating the insulated surface with ions of an energy sufficient to penetrate the layer and enter the underlying body and thereby modify the underlying conductivity of the body below the layer.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-7 are cancelled.

* * * * *